US011831721B2

(12) United States Patent
Beckhardt

(10) Patent No.: US 11,831,721 B2
(45) Date of Patent: *Nov. 28, 2023

(54) MIRRORED QUEUES

(71) Applicant: Sonos, Inc., Santa Barbara, CA (US)

(72) Inventor: Steven Beckhardt, Boston, MA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/896,385

(22) Filed: Aug. 26, 2022

(65) Prior Publication Data

US 2023/0124871 A1 Apr. 20, 2023

Related U.S. Application Data

(63) Continuation of application No. 16/813,223, filed on Mar. 9, 2020, now Pat. No. 11,431,804, which is a
(Continued)

(51) Int. Cl.
*H04L 67/125* (2022.01)
*G06Q 50/00* (2012.01)
(Continued)

(52) U.S. Cl.
CPC ........ *H04L 67/125* (2013.01); *G06F 16/4387* (2019.01); *G06F 16/686* (2019.01);
(Continued)

(58) Field of Classification Search
CPC . G06F 16/4387; G06F 16/686; H04L 67/125; G06Q 50/01; H04R 2227/003; H04R 2227/005
See application file for complete search history.

(56) References Cited

U.S. PATENT DOCUMENTS 4,296,278 A 10/1981 Cullison et al.
4,816,989 A 3/1989 Finn et al.
(Continued)

FOREIGN PATENT DOCUMENTS

EP 0251584 A2 1/1988
EP 0672985 A1 9/1995
(Continued)

OTHER PUBLICATIONS

Advisory Action dated Dec. 5, 2016, issued in connection with U.S. Appl. No. 14/231,911, filed Apr. 1, 2014, 3 pages.
(Continued)

*Primary Examiner* — William Spieler

(57) ABSTRACT

Embodiments disclosed herein involve a first playback device, associated with a first household, where the first playback device is configured to mirror a playback queue that is associated with a second playback device, where the second playback device is associated with a second household. For instance, a device associated with the first household, such as a controller, may send a command to the first playback device to mirror the playback queue associated with the second playback device. Based on the received command, the first playback device may mirror the playback queue that is associated with the second playback device such that contents of a playback queue that is associated with the first playback device are the same as contents of the playback queue that is associated with the second playback device.

20 Claims, 9 Drawing Sheets

Related U.S. Application Data continuation of application No. 14/231,911, filed on Apr. 1, 2014, now Pat. No. 10,587,693.

(51) Int. Cl.
    *G06F 16/68*     (2019.01)
    *G06F 16/438*     (2019.01)

(52) U.S. Cl.
    CPC ....... *G06Q 50/01* (2013.01); *H04R 2227/003* (2013.01); *H04R 2227/005* (2013.01)

(56) References Cited

U.S. PATENT DOCUMENTS

| | | |
|---|---|---|
| 5,182,552 A | 1/1993 | Paynting |
| 5,239,458 A | 8/1993 | Suzuki |
| 5,299,266 A | 3/1994 | Lumsden |
| 5,406,634 A | 4/1995 | Anderson et al. |
| 5,440,644 A | 8/1995 | Farinelli et al. |
| 5,467,342 A | 11/1995 | Logston et al. |
| 5,491,839 A | 2/1996 | Schotz |
| 5,553,222 A | 9/1996 | Milne et al. |
| 5,668,884 A | 9/1997 | Clair, Jr. et al. |
| 5,673,323 A | 9/1997 | Schotz et al. |
| 5,751,819 A | 5/1998 | Dorrough |
| 5,761,320 A | 6/1998 | Farinelli et al. |
| 5,808,662 A | 9/1998 | Kinney et al. |
| 5,815,689 A | 9/1998 | Shaw et al. |
| 5,856,827 A | 1/1999 | Sudo |
| 5,867,691 A | 2/1999 | Shiraishi |
| 5,875,354 A | 2/1999 | Charlton et al. |
| 5,887,143 A | 3/1999 | Saito et al. |
| 5,923,902 A | 7/1999 | Inagaki |
| 5,946,343 A | 8/1999 | Schotz et al. |
| 5,956,088 A | 9/1999 | Shen et al. |
| 6,002,862 A | 12/1999 | Takaike |
| 6,009,457 A | 12/1999 | Moller |
| 6,026,150 A | 2/2000 | Frank et al. |
| 6,031,818 A | 2/2000 | Lo et al. |
| 6,032,202 A | 2/2000 | Lea et al. |
| 6,108,686 A | 8/2000 | Williams, Jr. |
| 6,128,318 A | 10/2000 | Sato |
| 6,157,957 A | 12/2000 | Berthaud |
| 6,175,872 B1 | 1/2001 | Neumann et al. |
| 6,181,316 B1 | 1/2001 | Little et al. |
| 6,185,737 B1 | 2/2001 | Northcutt et al. |
| 6,195,436 B1 | 2/2001 | Scibora et al. |
| 6,199,169 B1 | 3/2001 | Voth |
| 6,226,672 B1 | 5/2001 | Demartin et al. |
| 6,255,961 B1 | 7/2001 | Van et al. |
| 6,256,554 B1 | 7/2001 | DiLorenzo |
| 6,308,207 B1 | 10/2001 | Tseng et al. |
| 6,324,586 B1 | 11/2001 | Johnson |
| 6,332,147 B1 | 12/2001 | Moran et al. |
| 6,349,339 B1 | 2/2002 | Williams |
| 6,351,821 B1 | 2/2002 | Voth |
| 6,404,811 B1 | 6/2002 | Cvetko et al. |
| 6,430,353 B1 | 8/2002 | Honda et al. |
| 6,469,633 B1 | 10/2002 | Wachter |
| 6,487,296 B1 | 11/2002 | Allen et al. |
| 6,522,886 B1 | 2/2003 | Youngs et al. |
| 6,526,325 B1 | 2/2003 | Sussman et al. |
| 6,587,127 B1 | 7/2003 | Leeke et al. |
| 6,598,172 B1 | 7/2003 | Vandeusen et al. |
| 6,611,537 B1 | 8/2003 | Edens et al. |
| 6,631,410 B1 | 10/2003 | Kowalski et al. |
| 6,674,803 B1 | 1/2004 | Kesselring |
| 6,728,531 B1 | 4/2004 | Lee et al. |
| 6,732,155 B2 | 5/2004 | Meek |
| 6,757,517 B2 | 6/2004 | Chang |
| 6,778,869 B2 | 8/2004 | Champion |
| 6,826,283 B1 | 11/2004 | Wheeler et al. |
| 6,836,788 B2 | 12/2004 | Kim et al. |
| 6,898,642 B2 | 5/2005 | Chafle et al. |
| 6,912,610 B2 | 6/2005 | Spencer |
| 6,920,373 B2 | 7/2005 | Xi et al. |
| 6,934,766 B1 | 8/2005 | Russell |
| 6,985,694 B1 | 1/2006 | De Bonet et al. |
| 7,007,106 B1 | 2/2006 | Flood et al. |
| 7,017,118 B1 | 3/2006 | Carroll |
| 7,020,048 B2 | 3/2006 | Mccomas |
| 7,020,791 B1 | 3/2006 | Aweya et al. |
| 7,043,651 B2 | 5/2006 | Aweya et al. |
| 7,047,308 B2 | 5/2006 | Deshpande |
| 7,113,833 B1 | 9/2006 | Brown et al. |
| 7,113,999 B2 | 9/2006 | Pestoni et al. |
| 7,115,017 B1 | 10/2006 | Laursen et al. |
| 7,117,451 B2 | 10/2006 | Sielken |
| 7,130,608 B2 | 10/2006 | Hollstrom et al. |
| 7,130,616 B2 | 10/2006 | Janik |
| 7,143,141 B1 | 11/2006 | Morgan et al. |
| 7,143,939 B2 | 12/2006 | Henzerling |
| 7,162,315 B2 | 1/2007 | Gilbert |
| 7,185,090 B2 | 2/2007 | Kowalski et al. |
| 7,187,947 B1 | 3/2007 | White et al. |
| 7,206,367 B1 | 4/2007 | Moore |
| 7,209,795 B2 | 4/2007 | Sullivan et al. |
| 7,218,708 B2 | 5/2007 | Berezowski et al. |
| 7,236,739 B2 | 6/2007 | Chang |
| 7,236,773 B2 | 6/2007 | Thomas |
| 7,293,060 B2 | 11/2007 | Komsi |
| 7,295,548 B2 | 11/2007 | Blank et al. |
| 7,312,785 B2 | 12/2007 | Tsuk et al. |
| 7,324,857 B2 | 1/2008 | Goddard |
| 7,333,519 B2 | 2/2008 | Sullivan et al. |
| 7,358,960 B2 | 4/2008 | Mak |
| 7,372,846 B2 | 5/2008 | Zwack |
| 7,392,102 B2 | 6/2008 | Sullivan et al. |
| 7,483,538 B2 | 1/2009 | McCarty et al. |
| 7,483,958 B1 | 1/2009 | Elabbady et al. |
| 7,555,291 B2 | 6/2009 | Wassingbo et al. |
| 7,571,014 B1 | 8/2009 | Lambourne et al. |
| 7,574,274 B2 | 8/2009 | Holmes |
| 7,599,685 B2 | 10/2009 | Goldberg et al. |
| 7,617,278 B1 | 11/2009 | Edelman et al. |
| 7,630,501 B2 | 12/2009 | Blank et al. |
| 7,634,068 B1 | 12/2009 | Flammer |
| 7,643,894 B2 | 1/2010 | Braithwaite et al. |
| 7,657,224 B2 | 2/2010 | Goldberg et al. |
| 7,657,644 B1 | 2/2010 | Zheng |
| 7,657,910 B1 | 2/2010 | McAulay et al. |
| 7,668,990 B2 | 2/2010 | Krzyzanowski et al. |
| 7,669,219 B2 | 2/2010 | Scott et al. |
| 7,675,943 B2 | 3/2010 | Mosig et al. |
| 7,676,142 B1 | 3/2010 | Hung |
| 7,702,279 B2 | 4/2010 | Ko et al. |
| 7,720,096 B2 | 5/2010 | Klemets |
| 7,742,740 B2 | 6/2010 | Goldberg et al. |
| 7,805,682 B1 | 9/2010 | Lambourne |
| 7,827,259 B2 | 11/2010 | Heller et al. |
| 7,835,689 B2 | 11/2010 | Goldberg et al. |
| 7,853,341 B2 | 12/2010 | McCarty et al. |
| 7,865,137 B2 | 1/2011 | Goldberg et al. |
| 7,885,622 B2 | 2/2011 | Krampf et al. |
| 7,890,661 B2 | 2/2011 | Spurgat et al. |
| 7,916,877 B2 | 3/2011 | Goldberg et al. |
| 7,917,082 B2 | 3/2011 | Goldberg et al. |
| 7,934,239 B1 | 4/2011 | Dagman |
| 7,937,422 B1 | 5/2011 | Ferguson, Jr. |
| 7,958,441 B2 | 6/2011 | Heller et al. |
| 7,987,294 B2 | 7/2011 | Bryce et al. |
| 8,014,423 B2 | 9/2011 | Thaler et al. |
| 8,023,663 B2 | 9/2011 | Goldberg |
| 8,028,038 B2 | 9/2011 | Weel |
| 8,028,323 B2 | 9/2011 | Weel |
| 8,045,952 B2 | 10/2011 | Qureshey et al. |
| 8,050,652 B2 | 11/2011 | Qureshey et al. |
| 8,065,708 B1 | 11/2011 | Smyth et al. |
| 8,074,253 B1 | 12/2011 | Nathan |
| 8,086,752 B2 | 12/2011 | Millington et al. |
| 8,103,009 B2 | 1/2012 | McCarty et al. |
| 8,112,032 B2 | 2/2012 | Ko et al. |
| 8,131,390 B2 | 3/2012 | Braithwaite et al. |
| 8,169,938 B2 | 5/2012 | Duchscher et al. |

(56) References Cited

U.S. PATENT DOCUMENTS

| | | |
|---|---|---|
| 8,214,431 B2 | 7/2012 | Miyajima et al. |
| 8,214,873 B2 | 7/2012 | Weel |
| 8,230,099 B2 | 7/2012 | Weel |
| 8,234,395 B2 | 7/2012 | Millington |
| 8,290,603 B1 | 10/2012 | Lambourne |
| 8,315,555 B2 | 11/2012 | Ko et al. |
| 8,370,678 B2 | 2/2013 | Millington et al. |
| 8,423,659 B2 | 4/2013 | Millington |
| 8,443,038 B2 | 5/2013 | Robbin et al. |
| 8,483,853 B1 | 7/2013 | Lambourne |
| 8,484,089 B1 | 7/2013 | Lin et al. |
| 8,588,949 B2 | 11/2013 | Lambourne et al. |
| 8,752,769 B2 | 6/2014 | Biderman |
| 8,775,546 B2 | 7/2014 | Millington |
| 8,818,538 B2 | 8/2014 | Sakata |
| 9,003,462 B2 | 4/2015 | Walker et al. |
| 9,137,564 B2 | 9/2015 | Reimann |
| 9,247,363 B2 | 1/2016 | Triplett et al. |
| 9,411,942 B2 | 8/2016 | Commons et al. |
| 9,524,487 B1 | 12/2016 | Yagnik et al. |
| 9,674,587 B2 | 6/2017 | Triplett et al. |
| 10,268,352 B2 | 4/2019 | Coburn, IV et al. |
| 2001/0009604 A1 | 7/2001 | Ando et al. |
| 2001/0022823 A1 | 9/2001 | Renaud |
| 2001/0032188 A1 | 10/2001 | Miyabe et al. |
| 2001/0042107 A1 | 11/2001 | Palm |
| 2002/0002039 A1 | 1/2002 | Qureshey et al. |
| 2002/0002562 A1 | 1/2002 | Moran et al. |
| 2002/0003548 A1 | 1/2002 | Krusche et al. |
| 2002/0022453 A1 | 2/2002 | Balog et al. |
| 2002/0026442 A1 | 2/2002 | Ipscomb et al. |
| 2002/0034374 A1 | 3/2002 | Barton |
| 2002/0042844 A1 | 4/2002 | Chiazzese |
| 2002/0049843 A1 | 4/2002 | Barone et al. |
| 2002/0065926 A1 | 5/2002 | Hackney et al. |
| 2002/0072816 A1 | 6/2002 | Shdema et al. |
| 2002/0073228 A1 | 6/2002 | Cognet et al. |
| 2002/0090914 A1 | 7/2002 | Kang et al. |
| 2002/0093478 A1 | 7/2002 | Yeh |
| 2002/0109710 A1 | 8/2002 | Holtz et al. |
| 2002/0112244 A1 | 8/2002 | Liou et al. |
| 2002/0124097 A1 | 9/2002 | Isely et al. |
| 2002/0129156 A1 | 9/2002 | Yoshikawa |
| 2002/0143998 A1 | 10/2002 | Rajagopal et al. |
| 2002/0163361 A1 | 11/2002 | Parkin |
| 2002/0165921 A1 | 11/2002 | Sapieyevski |
| 2002/0178191 A1 | 11/2002 | Sielken |
| 2002/0188762 A1 | 12/2002 | Tomassetti et al. |
| 2003/0002609 A1 | 1/2003 | Faller et al. |
| 2003/0020763 A1 | 1/2003 | Mayer et al. |
| 2003/0023741 A1 | 1/2003 | Tomassetti et al. |
| 2003/0035444 A1 | 2/2003 | Zwack |
| 2003/0041173 A1 | 2/2003 | Hoyle |
| 2003/0041174 A1 | 2/2003 | Wen et al. |
| 2003/0043924 A1 | 3/2003 | Haddad et al. |
| 2003/0066094 A1 | 4/2003 | Van Der Schaar et al. |
| 2003/0099212 A1 | 5/2003 | Anjum et al. |
| 2003/0099221 A1 | 5/2003 | Rhee |
| 2003/0126211 A1 | 7/2003 | Anttila et al. |
| 2003/0157951 A1 | 8/2003 | Hasty, Jr. |
| 2003/0195964 A1 | 10/2003 | Mane |
| 2003/0198257 A1 | 10/2003 | Sullivan et al. |
| 2003/0210796 A1 | 11/2003 | Mccarty et al. |
| 2003/0231871 A1 | 12/2003 | Ushimaru |
| 2003/0235304 A1 | 12/2003 | Evans et al. |
| 2004/0001484 A1 | 1/2004 | Ozguner |
| 2004/0001591 A1 | 1/2004 | Mani et al. |
| 2004/0008852 A1 | 1/2004 | Also et al. |
| 2004/0010727 A1 | 1/2004 | Fujinami |
| 2004/0015252 A1 | 1/2004 | Aiso et al. |
| 2004/0024478 A1 | 2/2004 | Hans et al. |
| 2004/0024925 A1 | 2/2004 | Cypher et al. |
| 2004/0025185 A1 | 2/2004 | Goci et al. |
| 2004/0027166 A1 | 2/2004 | Mangum et al. |
| 2004/0032348 A1 | 2/2004 | Lai et al. |
| 2004/0066736 A1 | 4/2004 | Kroeger |
| 2004/0075767 A1 | 4/2004 | Neuman et al. |
| 2004/0078383 A1 | 4/2004 | Mercer et al. |
| 2004/0078812 A1 | 4/2004 | Calvert |
| 2004/0131192 A1 | 7/2004 | Metcalf |
| 2004/0170383 A1 | 9/2004 | Mazur |
| 2004/0203378 A1 | 10/2004 | Powers |
| 2004/0215611 A1 | 10/2004 | Jawa et al. |
| 2004/0249965 A1 | 12/2004 | Huggins et al. |
| 2004/0249982 A1 | 12/2004 | Arnold et al. |
| 2004/0252400 A1 | 12/2004 | Blank et al. |
| 2004/0261040 A1 | 12/2004 | Radcliffe et al. |
| 2005/0010691 A1 | 1/2005 | Oyadomari et al. |
| 2005/0013394 A1 | 1/2005 | Rausch et al. |
| 2005/0021590 A1 | 1/2005 | Debique et al. |
| 2005/0047605 A1 | 3/2005 | Lee et al. |
| 2005/0058149 A1 | 3/2005 | Howe |
| 2005/0081213 A1 | 4/2005 | Suzuoki et al. |
| 2005/0108320 A1 | 5/2005 | Lord et al. |
| 2005/0114538 A1 | 5/2005 | Rose |
| 2005/0125357 A1 | 6/2005 | Saadat et al. |
| 2005/0166157 A1 | 7/2005 | Ollis et al. |
| 2005/0177643 A1 | 8/2005 | Xu |
| 2005/0181348 A1 | 8/2005 | Carey et al. |
| 2005/0195205 A1 | 9/2005 | Abrams |
| 2005/0281255 A1 | 12/2005 | Davies et al. |
| 2005/0283820 A1 | 12/2005 | Richards et al. |
| 2005/0288805 A1 | 12/2005 | Moore et al. |
| 2005/0289224 A1 | 12/2005 | Deslippe et al. |
| 2006/0095516 A1 | 5/2006 | Wijeratne |
| 2006/0107237 A1 | 5/2006 | Kim |
| 2006/0119497 A1 | 6/2006 | Miller et al. |
| 2006/0143236 A1 | 6/2006 | Wu |
| 2006/0168340 A1 | 7/2006 | Heller et al. |
| 2006/0253782 A1 | 11/2006 | Stark et al. |
| 2006/0277216 A1 | 12/2006 | Shukhman |
| 2007/0038999 A1 | 2/2007 | Millington |
| 2007/0048713 A1 | 3/2007 | Plastina et al. |
| 2007/0054680 A1 | 3/2007 | Mo et al. |
| 2007/0142022 A1 | 6/2007 | Madonna et al. |
| 2007/0142944 A1 | 6/2007 | Goldberg et al. |
| 2007/0143493 A1 | 6/2007 | Mullig et al. |
| 2007/0169115 A1 | 7/2007 | Ko et al. |
| 2007/0180137 A1 | 8/2007 | Rajapakse |
| 2007/0255752 A1 | 11/2007 | Miller |
| 2007/0271388 A1 | 11/2007 | Bowra et al. |
| 2007/0288470 A1 | 12/2007 | Kauniskangas et al. |
| 2007/0299778 A1 | 12/2007 | Haveson et al. |
| 2008/0005690 A1 | 1/2008 | Van Vugt |
| 2008/0016465 A1 | 1/2008 | Foxenland |
| 2008/0022320 A1 | 1/2008 | Ver Steeg |
| 2008/0091771 A1 | 4/2008 | Allen et al. |
| 2008/0120429 A1 | 5/2008 | Millington et al. |
| 2008/0144861 A1 | 6/2008 | Melanson et al. |
| 2008/0168185 A1 | 7/2008 | Robbin et al. |
| 2008/0168391 A1 | 7/2008 | Robbin et al. |
| 2008/0168526 A1 | 7/2008 | Robbin et al. |
| 2009/0006479 A1 | 1/2009 | Fujita et al. |
| 2009/0031336 A1 | 1/2009 | Chavez et al. |
| 2009/0157905 A1 | 6/2009 | Davis |
| 2009/0222115 A1 | 9/2009 | Malcolm et al. |
| 2009/0222392 A1 | 9/2009 | Martin et al. |
| 2009/0228919 A1 | 9/2009 | Zott et al. |
| 2010/0017474 A1 | 1/2010 | Kandekar et al. |
| 2010/0049835 A1 | 2/2010 | Ko et al. |
| 2010/0082731 A1 | 4/2010 | Haughay et al. |
| 2010/0131567 A1 | 5/2010 | Dorogusker et al. |
| 2010/0228740 A1 | 9/2010 | Cannistraro et al. |
| 2010/0257203 A1 | 10/2010 | Sun |
| 2010/0284389 A1 | 11/2010 | Ramsay et al. |
| 2011/0066943 A1 | 3/2011 | Brillon et al. |
| 2011/0067099 A1 | 3/2011 | Barton et al. |
| 2011/0135283 A1 | 6/2011 | Poniatowki et al. |
| 2011/0218656 A1 | 9/2011 | Bishop et al. |
| 2011/0246689 A1 | 10/2011 | Naito et al. |
| 2011/0264732 A1 | 10/2011 | Robbin et al. |
| 2012/0029671 A1 | 2/2012 | Millington et al. |
| 2012/0030366 A1 | 2/2012 | Collart et al. |
| 2012/0060046 A1 | 3/2012 | Millington |

(56) References Cited

U.S. PATENT DOCUMENTS

| | | |
|---|---|---|
| 2012/0088477 A1 | 4/2012 | Cassidy |
| 2012/0117026 A1 | 5/2012 | Cassidy |
| 2012/0129446 A1 | 5/2012 | Ko et al. |
| 2012/0158531 A1 | 6/2012 | Dion et al. |
| 2012/0190406 A1 | 7/2012 | Chen |
| 2012/0191816 A1 | 7/2012 | Beckhardt et al. |
| 2012/0215684 A1 | 8/2012 | Kidron |
| 2013/0024880 A1 | 1/2013 | Moloney-Egnatios et al. |
| 2013/0031216 A1 | 1/2013 | Willis et al. |
| 2013/0073613 A1 | 3/2013 | Ferguson, Jr. |
| 2013/0080599 A1 | 3/2013 | Ko et al. |
| 2013/0080658 A1 | 3/2013 | Ferguson, Jr. |
| 2013/0159858 A1 | 6/2013 | Joffray et al. |
| 2013/0191454 A1 | 7/2013 | Oliver et al. |
| 2013/0228063 A1 | 9/2013 | Turner |
| 2013/0339397 A1 | 12/2013 | Herasymchuk |
| 2014/0052823 A1 | 2/2014 | Gavade et al. |
| 2014/0140674 A1 | 5/2014 | Jallad et al. |
| 2014/0204076 A1 | 7/2014 | Kuper et al. |
| 2014/0223099 A1 | 8/2014 | Kidron |
| 2014/0358951 A1 | 12/2014 | Luna et al. |
| 2015/0025661 A1 | 1/2015 | Vega-Zayas et al. |
| 2015/0063774 A1 | 3/2015 | Brown, Jr. et al. |
| 2015/0067871 A1 | 3/2015 | Commons et al. |
| 2015/0074059 A1 | 3/2015 | Bilinski et al. |
| 2015/0220498 A1 | 8/2015 | Munoz et al. |

FOREIGN PATENT DOCUMENTS

| | | |
|---|---|---|
| EP | 1111527 A2 | 6/2001 |
| EP | 1389853 A1 | 2/2004 |
| WO | 199525313 | 9/1995 |
| WO | 199961985 | 12/1999 |
| WO | 200147248 | 6/2001 |
| WO | 200153994 | 7/2001 |
| WO | 2003093950 A2 | 11/2003 |
| WO | 2005013047 A2 | 2/2005 |

OTHER PUBLICATIONS

Advisory Action dated Dec. 1, 2017, issued in connection with U.S. Appl. No. 14/231,911, filed Apr. 1, 2014, 5 pages.

Advisory Action dated Sep. 5, 2018, issued in connection with U.S. Appl. No. 14/231,911, filed Apr. 1, 2014, 3 pages.

Akyildiz et al., "Multimedia Group Synchronization Protocols for Integrated Services Networks," IEEE Journal on Selected Areas in Communications, 1996 pp. 162-173, vol. 14, No. 1.

AudioTron Quick Start Guide, Version 1.0, Mar. 2001, 24 pages.

Audio Tron Reference Manual, Version 3.0, May 2002, 70 pages.

AudioTron Setup Guide, Version 3.0, May 2002, 38 pages.

Benslimane Abderrahim, "A Multimedia Synchronization Protocol for Multicast Groups," Proceedings of the 26th Euromicro Conference, 2000, pp. 456-463, vol. 1.

Biersack et al., "Intra- and Inter-Stream Synchronization for Stored Multimedia Streams," IEEE International Conference on Multimedia Computing and Systems, 1996, pp. 372-381.

Bluetooth. "Specification of the Bluetooth System: The ad hoc SCATTERNET for affordable and highly functional wireless connectivity," Core, Version 1.0 A, Jul. 26, 1999, 1068 pages.

Bluetooth. "Specification of the Bluetooth System: Wireless connections made easy," Core, Version 1.0 B, Dec. 1, 1999, 1076 pages.

Bretl W.E., et al., MPEG2 Tutorial [online], 2000 [retrieved on Jan. 13, 2009] Retrieved from the Internet:(http://www.bretl.com/mpeghtml/MPEGindex.htm), pp. 1-23.

Dell, Inc. "Dell Digital Audio Receiver: Reference Guide," Jun. 2000, 70 pages.

Dell, Inc. "Start Here," Jun. 2000, 2 pages.

"Denon 2003-2004 Product Catalog," Denon, 2003-2004, 44 pages.

Final Office Action dated Feb. 11, 2022, issued in connection with U.S. Appl. No. 16/813,223, filed Mar. 9, 2020, 7 pages.

Final Office Action dated Jul. 26, 2017, issued in connection with U.S. Appl. No. 14/231,911, filed Apr. 1, 2014, 53 pages.

Final Office Action dated Jun. 27, 2018, issued in connection with U.S. Appl. No. 14/231,911, filed Apr. 1, 2014, 55 pages.

Final Office Action dated Sep. 28, 2016, issued in connection with U.S. Appl. No. 14/231,911, filed Apr. 1, 2014, 24 pages.

First Action Interview Office Action Summary dated Apr. 18, 2016, issued in connection with U.S. Appl. No. 14/231,911, filed Apr. 1, 2014, 12 pages.

Huang C.M., et al., "A Synchronization Infrastructure for Multicast Multimedia at the Presentation Layer," IEEE Transactions on Consumer Electronics, 1997, pp. 370-380, vol. 43, No. 3.

Ishibashi et al., "A Group Synchronization Mechanism for Live Media in Multicast Communications," IEEE Global Telecommunications Conference, 1997, pp. 746-752, vol. 2.

Ishibashi et al., "A Group Synchronization Mechanism for Stored Media in Multicast Communications," IEEE Information Revolution and Communications, 1997, pp. 692-700, vol. 2.

Jo et al., "Synchronized One-to-many Media Streaming with Adaptive Playout Control," Proceedings of SPIE, 2002, pp. 71-82, vol. 4861.

Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.

Louderback, Jim, "Affordable Audio Receiver Furnishes Homes With MP3," TechTV Vault. Jun. 28, 2000 retrieved Jul. 10, 2014, 2 pages.

Mills David L., "Network Time Protocol (Version 3) Specification, Implementation and Analysis," Network Working Group, Mar. 1992, 7 pages.

Mills, David L., "Precision Synchronization of Computer Network Clocks," ACM SIGCOMM Computer Communication Review, 1994, pp. 28-43, vol. 24, No. 2.

Motorola, "Simplefi, Wireless Digital Audio Receiver, Installation and User Guide," Dec. 31, 2001, 111 pages.

Nilsson, M., "ID3 Tag Version 2," Mar. 26, 1998, 28 pages.

Non-Final Office Action dated Jan. 3, 2017, issued in connection with U.S. Appl. No. 14/231,911, filed Apr. 1, 2014, 39 pages.

Non-Final Office Action dated Jan. 11, 2018, issued in connection with U.S. Appl. No. 14/231,911, filed Apr. 1, 2014, 48 pages.

Non-Final Office Action dated Aug. 25, 2021, issued in connection with U.S. Appl. No. 16/813,223, filed Mar. 9, 2020, 13 pages.

Non-Final Office Action dated Nov. 30, 2018, issued in connection with U.S. Appl. No. 14/231,911, filed Apr. 1, 2014, 64 pages.

North American MPEG-2 Information, "The MPEG-2 Transport Stream," Retrieved from the Internet: URL: http://www.coolstf.com/mpeg/#ts, 2006, pp. 1-5.

Notice of Allowance dated Jul. 15, 2019, issued in connection with U.S. Appl. No. 14/231,911, filed Apr. 1, 2014, 20 pages.

Notice of Allowance dated Apr. 21, 2022, issued in connection with U.S. Appl. No. 16/813,223, filed Mar. 9, 2020, 7 pages.

Notice of Allowance dated Oct. 23, 2019, issued in connection with U.S. Appl. No. 14/231,911, filed Apr. 1, 2014, 7 pages.

Palm, Inc., "Handbook for the Palm VII Handheld," May 2000, 311 pages.

Park et al., "Group Synchronization in MultiCast Media Communications," Proceedings of the 5th Research on Multicast Technology Workshop, 2003, 5 pages.

Polycom Conference Composer User Guide, copyright 2001, 29 pages.

Preinterview Office Action dated Feb. 29, 2016, issued in connection with U.S. Appl. No. 14/231,911, filed Apr. 1, 2014, 10 pages.

Presentations at WinHEC 2000, May 2000, 138 pages.

PRISMIQ, Inc., "PRISMIQ Media Player User Guide," 2003, 44 pages.

Reisinger, Don, "Make Your House Rock from Any Room," PCWorld, Jul. 19, 2011, pp. 1-4.

Rothermel et al., "An Adaptive Stream Synchronization Protocol," 5th International Workshop on Network and Operating System Support for Digital Audio and Video, 1995, 13 pages.

Schulzrinne H., et al., "RTP: A Transport Protocol for Real-Time Applications, RFC 3550," Network Working Group, 2003, pp. 1-89.

(56) References Cited

OTHER PUBLICATIONS

U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 32 manual: copyright 2001.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

MIRRORED QUEUES

CROSS REFERENCE TO RELATED APPLICATIONS

This application is a continuation of and claims priority to U.S. patent application Ser. No. 16/813,223, filed on Mar. 9, 2020, and issued as U.S. Pat. No. 11,431,804, which is a continuation of and claims priority to U.S. patent application Ser. No. 14/231,911, filed on Apr. 1, 2014, and issued as U.S. Pat. No. 10,587,693, each of which is hereby incorporated by reference in its entirety for all purposes.

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
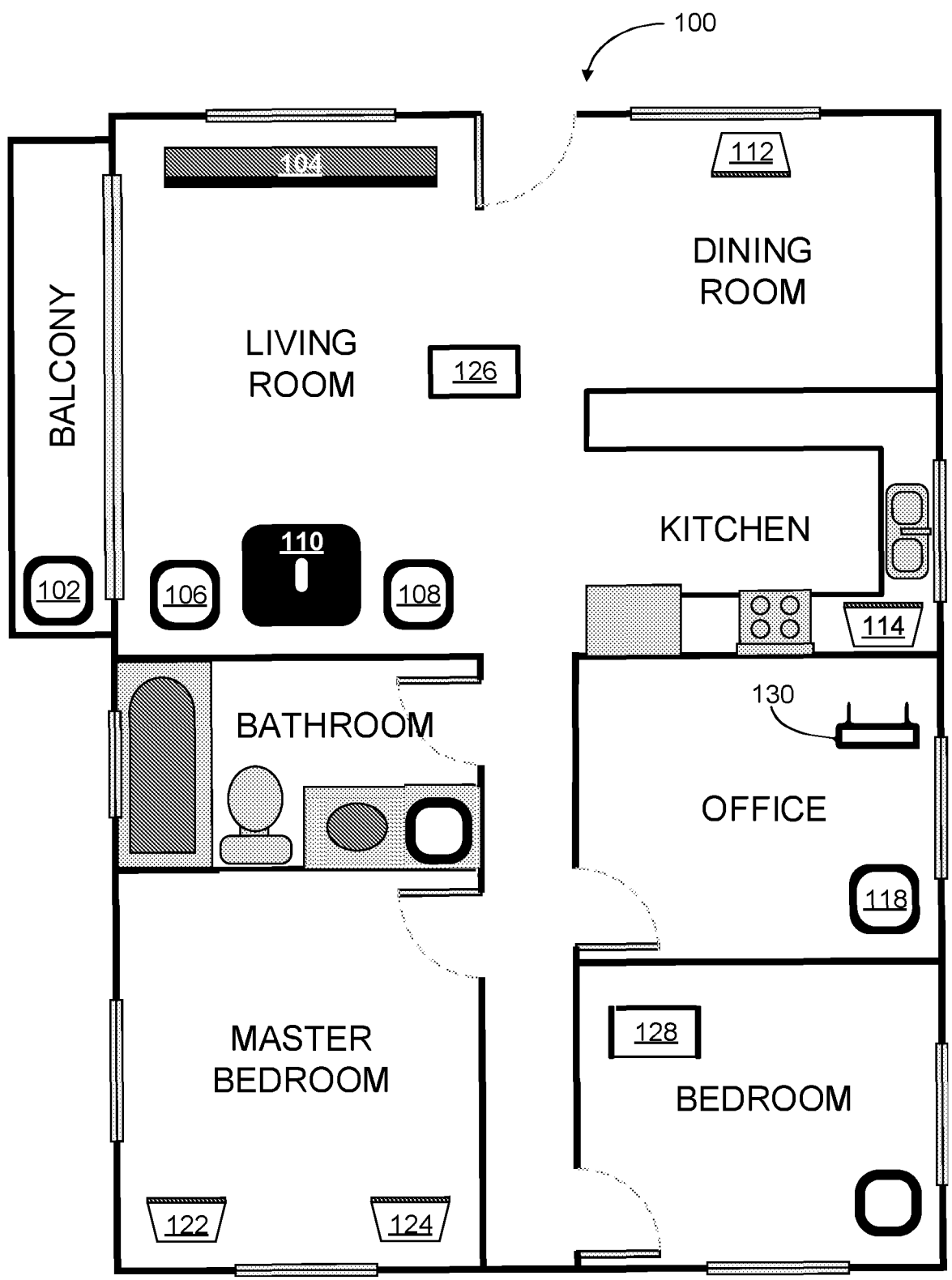
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

Embodiments disclosed herein provide a first media playback system that may "mirror" the playback queue of a second media playback system such that the playback queue of the first media playback system is the same as the playback queue of the second media playback system. Upon such mirroring of a playback queue, updates to the playback queue of the second media playback system may be reflected in the playback queue of the first media playback system. In this way, a user of the first playback system may, in some respects, turn control of his/her listening experience over to a user of the second playback system.

Handing over control of the listening experience may allow the user of the second playback system to act as a "remote DJ" by controlling the "mirrored" playback queue of the first media playback system from a remote location. And the user of the second playback system may also control multiple other playback systems, such that users from all across the world can "mirror" their respective playback queue and thereby hand over control of the "mirrored" queues to the "remote DJ".

For example, a first media playback system (i.e., a first "household," as described further below) may include at least a first playback device having a playback queue (i.e., a first playback queue). Further, a second media playback system (i.e. a second "household") may include at least a second playback device having a playback queue (i.e. a second playback queue). The first playback device may mirror the second playback queue such that the contents (e.g. multimedia items) of the first playback queue match the contents of the first playback queue.

In one example, a device associated with the first household, such as a controller, may send a command to the first playback device to mirror the playback queue that is associated with the second playback device. Based on the received command, the first playback device may then mirror the playback queue that is associated with the second playback device.

Once the playback queue is mirrored, control of the mirrored playback queue of the first media playback system by devices associated with the first household may be limited in some respects. For example, the first playback device (as well as other devices associated with first household) may be unable to control playback of the mirrored playback queue. In this case, playback of the mirrored playback queue may be carried out by one or more devices associated with the second household.

As indicated above, the present application involves a first playback device, associated with a first household, which is configured to mirror a playback queue that is associated with a second playback device, where the second playback device is associated with a second household.

In one aspect, a device is provided. The device includes a first playback device, where the first playback device includes a processor, a network interface, a non-transitory computer-readable storage medium, and program logic stored on the non-transitory computer-readable medium and executable by the processor to perform functions. The functions include receiving a command, the command indicating that the first playback device is to mirror a playback queue that is associated with a second playback device, where the first playback device is associated with a first household, and where the second playback device is associated with a second household. The functions also include, based on the command, mirroring the playback queue that is associated with the second playback device such that contents of a playback queue that is associated with the first playback device are the same as contents of the playback queue that is associated with the second playback device.

In another aspect, a method is provided. The method involves receiving a command, at a first playback device that is associated with a first household, the command indicating that the first playback device is to mirror a playback queue that is associated with a second playback device, where the second playback device is associated with a second household. The method also involves, based on the command, mirroring the playback queue that is associated with the second playback device such that contents of a playback queue that is associated with the first playback device are the same as contents of the playback queue that is associated with the second playback device.

In yet another aspect, a non-transitory computer readable memory is provided. The non-transitory computer readable memory has stored thereon instructions executable by a processor to cause the processor to perform functions. The functions include associating the first playback device with a first household. The functions also include receiving a command, the command indicating that the first playback device is to mirror a playback queue that is associated with a second playback device, where the second playback device is associated with a second household. The functions further include, based on the command, mirroring the playback queue that is associated with the second playback device such that contents of a playback queue that is associated with the first playback device are the same as contents of the playback queue that is associated with the second playback device.

It will be understood by one of ordinary skill in the art that this disclosure includes numerous other embodiments.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
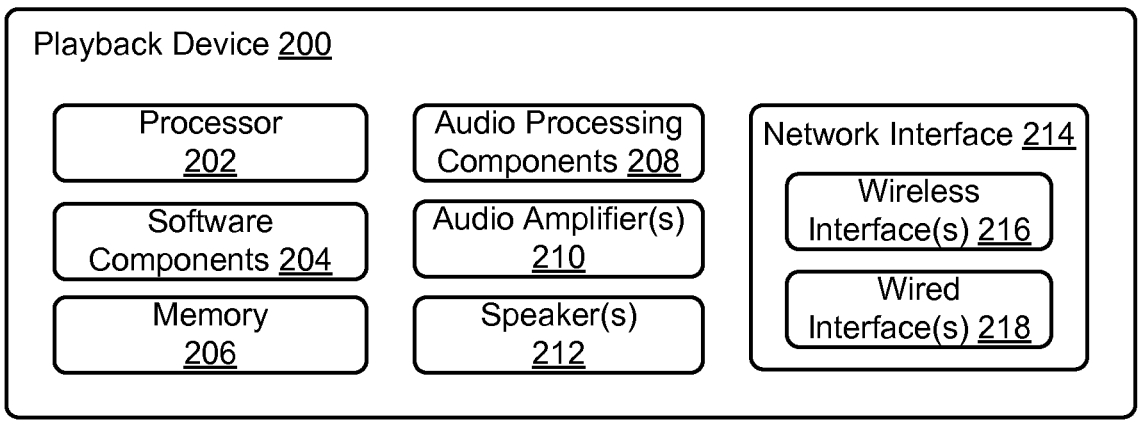
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, and a network interface 214 including wireless interface(s) 216 and wired interface(s) 218. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
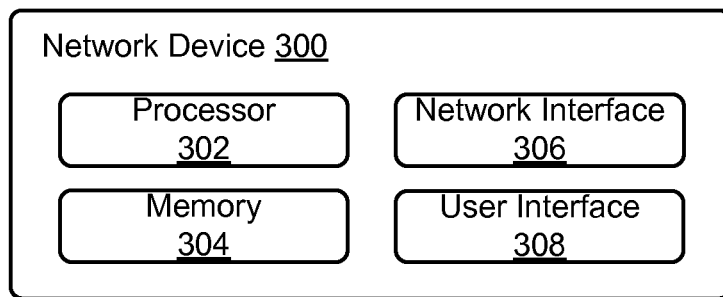
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include a processor 302, memory 304, a network interface 306, and a user interface 308. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
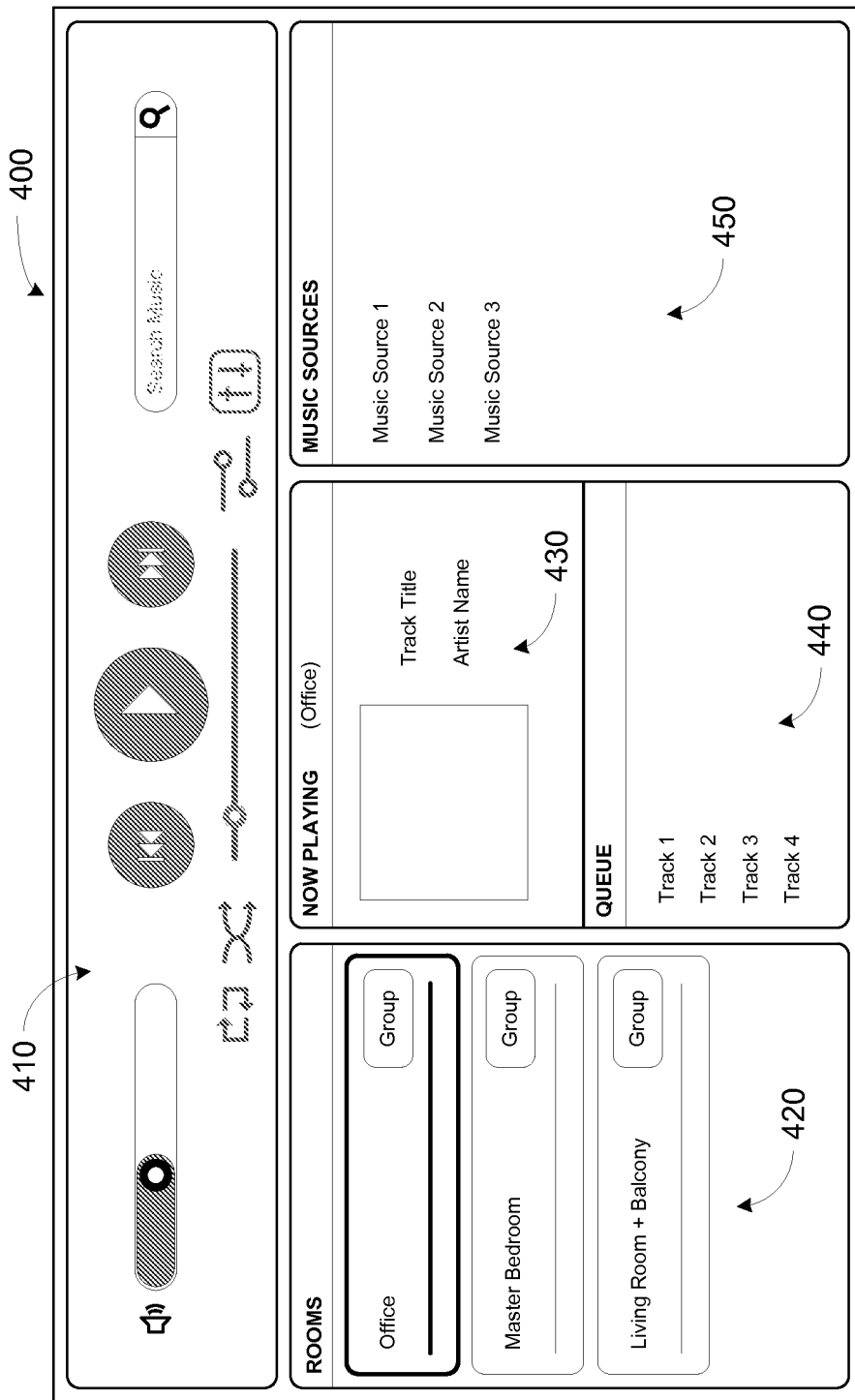
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

III. Example Mirroring of Playback Queues

As discussed above, embodiments described herein may involve a first playback device that may mirror a playback queue associated with a second playback device.

Figure 5:
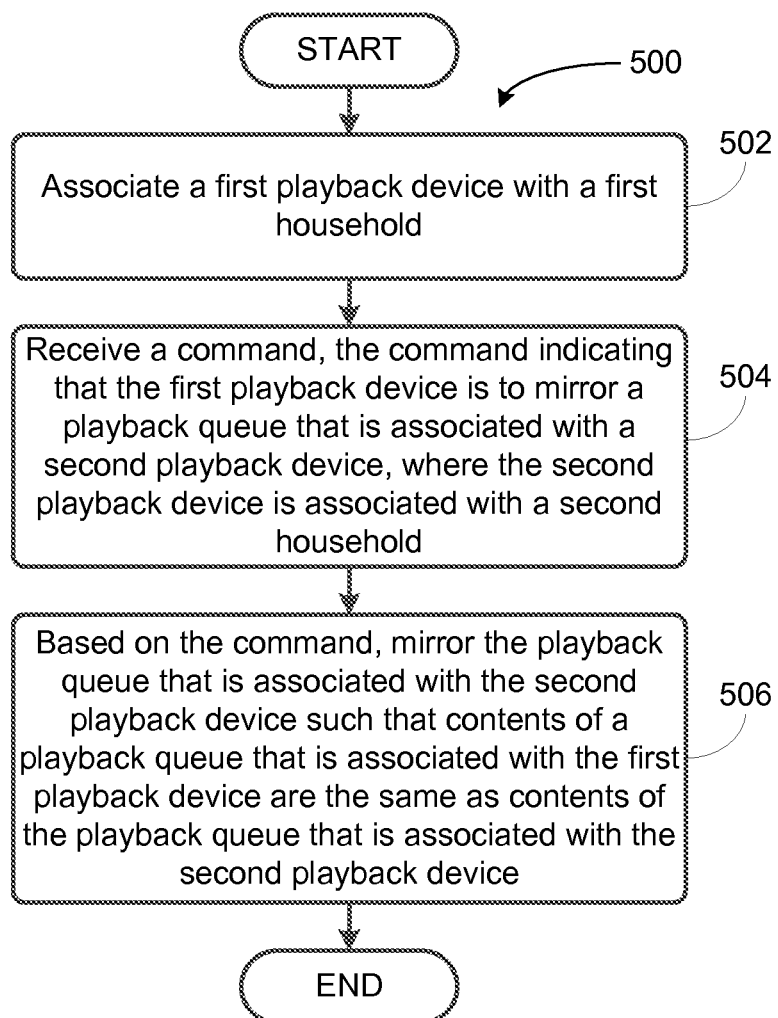
FIG. 5 shows an example flow diagram for mirroring playback queues according to an example embodiment.

Method 500 shown in FIG. 5 presents an embodiment of a method that can be implemented within an operating environment involving, for example, the media playback system 100 of FIG. 1, one or more of the playback device 200 of FIG. 2, and one or more of the control device 300 of FIG. 3. Method 500 may include one or more operations, functions, or actions as illustrated by one or more of blocks 502-506. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 500 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 500 and other processes and methods disclosed herein, each block in FIG. 5 may represent circuitry that is wired to perform the specific logical functions in the process.

Figure 6:
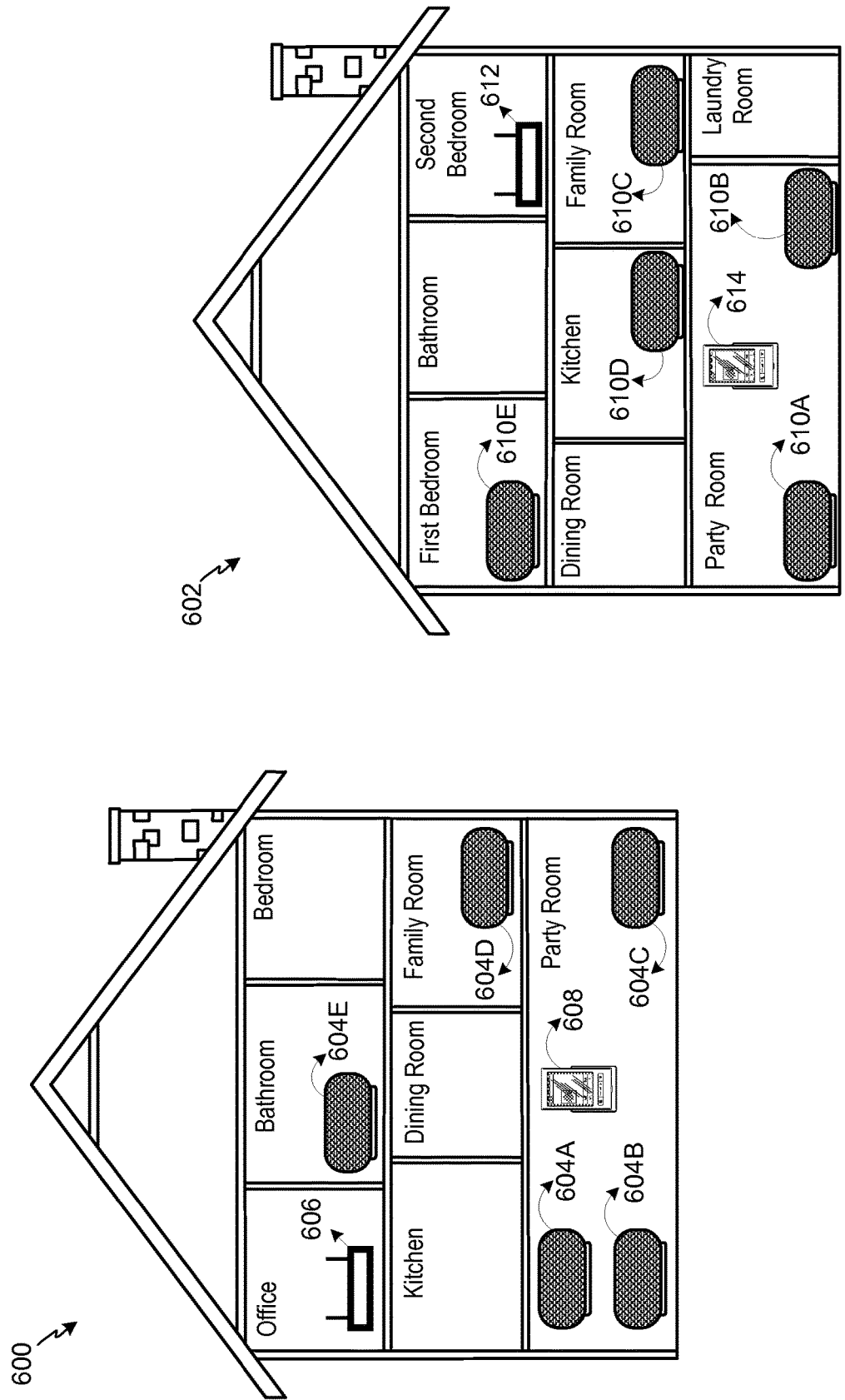
FIG. 6 shows an example household configuration for mirroring playback queues.

In the following discussions of FIG. 5, reference is made to FIG. 6. Therefore, a brief description of FIG. 6 is now provided. FIG. 6 shows a first example household configuration 600 ("household 600") that includes playback devices 604A-604E, router 606, and controller 608. Additionally, FIG. 6 shows a second example household configuration 602 ("household 602") that includes playback devices 610A-610E, router 612, and controller 614. The playback devices, routers, and controllers may be any of the corresponding devices as described above in association with FIGS. 1-3, among other examples. Further, households 600 and 602 may also be referred to as media playback systems and may be configured to include any of the features of system 100 as described above in association with of FIG. 1.

The first household 600 is shown as including a number of example "zones," including a party room zone, a family room zone, and a bathroom zone. However, this configuration is for purposes of example only, and additional and/or alternative zones may be included within the household. The family room zone and the bathroom zone each have one playback device (i.e., 604D and 604E, respectively), while the party room zone has multiple playback devices (i.e., 604A, 604B, and 604C). In the party room zone, one or more of playback devices 604A, 604B, and 604C may be configured to play audio content in synchrony. As shown, router 606 is in the office and controller 608 is in the party room. However, the router 606 and controller 608 may alternatively be located anywhere in the first household 600. Other zone configurations in first household 600 are also possible.

Similarly, the second household 602 may include a party room zone, a family room zone, a kitchen zone, and a first bedroom zone. The family room zone, the kitchen zone, and the first bedroom zone each have one playback device (i.e., 610C, 610D, and 610E, respectively), while the party room zone has multiple playback devices. In the party room zone, playback devices 610A and 610B may be configured to play audio content in synchrony. As shown, router 612 is in the second bedroom and controller 614 is in the party room. However, the router 612 and controller 614 may alternatively be located anywhere in the second household 602. Other zone configurations in second household 602 may also be possible.

a. Associating a First Playback Device with a First Household

At block 502, method 500 involves associating a first playback device with a first household.

The term "household" as used herein may be understood to refer to a given media playback system, where the household (or media playback system) includes one or more playback devices. In accordance with block 502, for instance, the first household may be first household 600 of FIG. 6 as described above. For illustration purposes only, the first playback device may be playback device 604A of first household 600. Therefore, for purposes of explanation, the first playback device may also be referred to as playback device 604A. However, note that embodiments described herein may apply to any of the playback devices of household 600 and thus, any of the playback devices of household 600 may play the role of a first playback device. Further, it should be understood that household 600 presents just one example of a household for purposes of example and explanation, and that other example households may exist. Yet further, note that while the term "household" is used herein, a media playback system may be located anywhere.

The first playback device may be associated with the first household, in accordance with block 502, in any suitable manner. For example, playback devices may be communicatively coupled directly or indirectly to a data network that may be distributed in and around a media playback system. For instance, a data network can be a wired network, a wireless network, or a combination of both wired and wireless networks. To illustrate, consider the network interface 214 as discussed above in association with FIG. 2. The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet.

In one implementation, associating the first playback device with the first household involves the first playback device carrying out functions to become associated with the household. For example, connecting a playback device to a broadband router (e.g., router 606) may form a data network. Other playback devices may then be added, wired or wirelessly, to the data network. For instance, a playback device (e.g., device 604A) may be added to the media playback system (e.g., household 600) by a user pressing a button on the playback device itself (or by performing some other action), which enables a connection from the playback device to the data network.

Additionally and/or alternatively, associating the first playback device with the first household may involve a controller of the first household directing the first playback device to be associated with the first household. For example, consider the commands described above in association with control device 300 of FIG. 3. In particular, data may be communicated between control device 300 and other devices via the network interface 306. For instance, changes to configurations of the media playback system 100 may be performed by a user using the control device 300 in order to associate a first playback device with a first household.

The configuration changes may include adding/removing one or more playback devices to/from a zone, adding/removing one or more zones to/from a zone group, forming a bonded or consolidated player, or separating one or more playback devices from a bonded or consolidated player, among others. Further, the user interface 308 of the control device 300 may be configured to facilitate user access and control of the media playback system 100, by including a controller interface such as the controller interface 400 shown in FIG. 4.

Accordingly, a control device such as controller 608 of household 600 may similarly include a user interface configured to facilitate user access and control of household 600. For example, devices associated with household 600 may receive commands from controller 608 indicating changes to configurations of the playback system as described above in association with FIG. 3. For instance, playback device 604A may receive a command to join a zone (e.g., the party room zone) that includes playback devices 604B-C. Once the command is executed, playback device 604A may be configured to play audio content in synchrony with playback devices 604B-C. As a result, device 604A may then be associated with household 600 in accordance with block 602. Other examples may also be possible.

Note that, in some cases, an example method, or some functions thereof, may be carried out after associating a first playback device with a first household. In other words, associating a first playback device with a first household may be performed at a point in time prior to the beginning of the example method. For instance, an example method may begin with block 504 as described below. In such an instance, the first playback device may have been previously associated with the first household. Other cases may also be possible.

b. Receiving a Command to Mirror a Playback Queue

At block 504, method 500 involves receiving a command, the command indicating that the first playback device is to mirror a playback queue that is associated with a second playback device, where the second playback device is associated with a second household.

As noted above, the term "household" as used herein may be understood to refer to a given media playback system, where the household (or media playback system) includes one or more playback devices. In one example, the second household may be second household 602 of FIG. 6 as described above. To illustrate, the second playback device may be playback device 610A of the second household 602. Accordingly, for purposes of explanation, the second playback device may also be referred to as playback device 610A. However, note that embodiments described herein may apply to any of the playback devices of household 602 and thus, any of the playback devices of household 602 may play the role of a second playback device, among other examples. Further, it should be understood that household 602 presents an illustration of a household for purposes of example and explanation, and that other example households may exist.

Further, as discussed above in accordance with block 502, devices associated with the first household (e.g., household 600) may receive commands from a controller (e.g., controller 608). For example, a received command may indicate that the first playback device (e.g., playback device 604A) is to mirror a playback queue that is associated with a second playback device (e.g., playback device 610A), where the second playback device is associated with a second household (e.g., household 602). Note that the command may be communicated from any device of household 600. Also, note that a playback queue may be configured to include any of the features described above in association with playback queue region 440 of FIG. 4.

The command may be received as a result of user input gathered via a user interface of the controller device, where the user interface may be configured to facilitate user access and control of household 600. For example, referring back to the user interface 400 of FIG. 4, the graphical representations of audio content in the playback queue region 440 may include track titles, artist names, track lengths, and other relevant information associated with the audio content in the playback queue.

Accordingly, a user interface of controller 608 may include selectable icons to manage and/or manipulate the playback queue of a playback device, such as selectable icons to initiate a command indicating that a first playback device is to mirror a playback queue that is associated with a second playback device, where the second playback device is associated with a second household. As such, the command may be received by playback device 604A as a result of user input received via a user interface of the controller 608. Other examples may also be possible.

c. Mirroring the Playback Queue

At block 506, method 500 involves, based on the command, mirroring the playback queue that is associated with the second playback device such that contents of a playback queue that is associated with the first playback device are the same as contents of the playback queue that is associated with the second playback device.

Mirroring a playback queue may involve functions such as establishing access, via the playback queue associated with the first playback device, to the same audio content as presented in the playback queue associated with the second playback device. For example, the playback queue associated with the second playback device may include an audio track "A", among other possible audio tracks. The audio track "A" may have been retrieved, for example, from a source such as a streaming content provider. As a result, the second playback device may provide information to the first playback device indicating particular steps for retrieving audio track "A" from the streaming content provider. The first playback device may then, in turn, add the track to the playback queue and subsequently use the obtained information to retrieve audio track "A" from the streaming content provider.

Similarly, the first playback device may receive information from the second playback device for retrieving other audio content presented in the playback queue associated with the second playback device. The first playback device may then use the information to retrieve the audio content such that audio content of the playback queue that is associated with the first playback device is the same as audio content of the playback queue that is associated with the second playback device.

An exchange of information between the first playback device and the second playback device for the purposes of mirroring a playback queue may require communication between the first playback device and the second playback device. Hence, one or more devices associated with the first household may communicate with one or more devices associated with the second household in a number of different manners as described below.

In one embodiment, households 600 and 602 may communicate via a direct communication link with one another. For instance, playback devices 604A and 610A may communicate via a direct communication link to share and/or transmit information. Note that any device of household 600 may communicate via a direct communication link with any device of household 602 (e.g., controller 614 may communicate via a direct communication link with playback device 604E).

Figure 7:
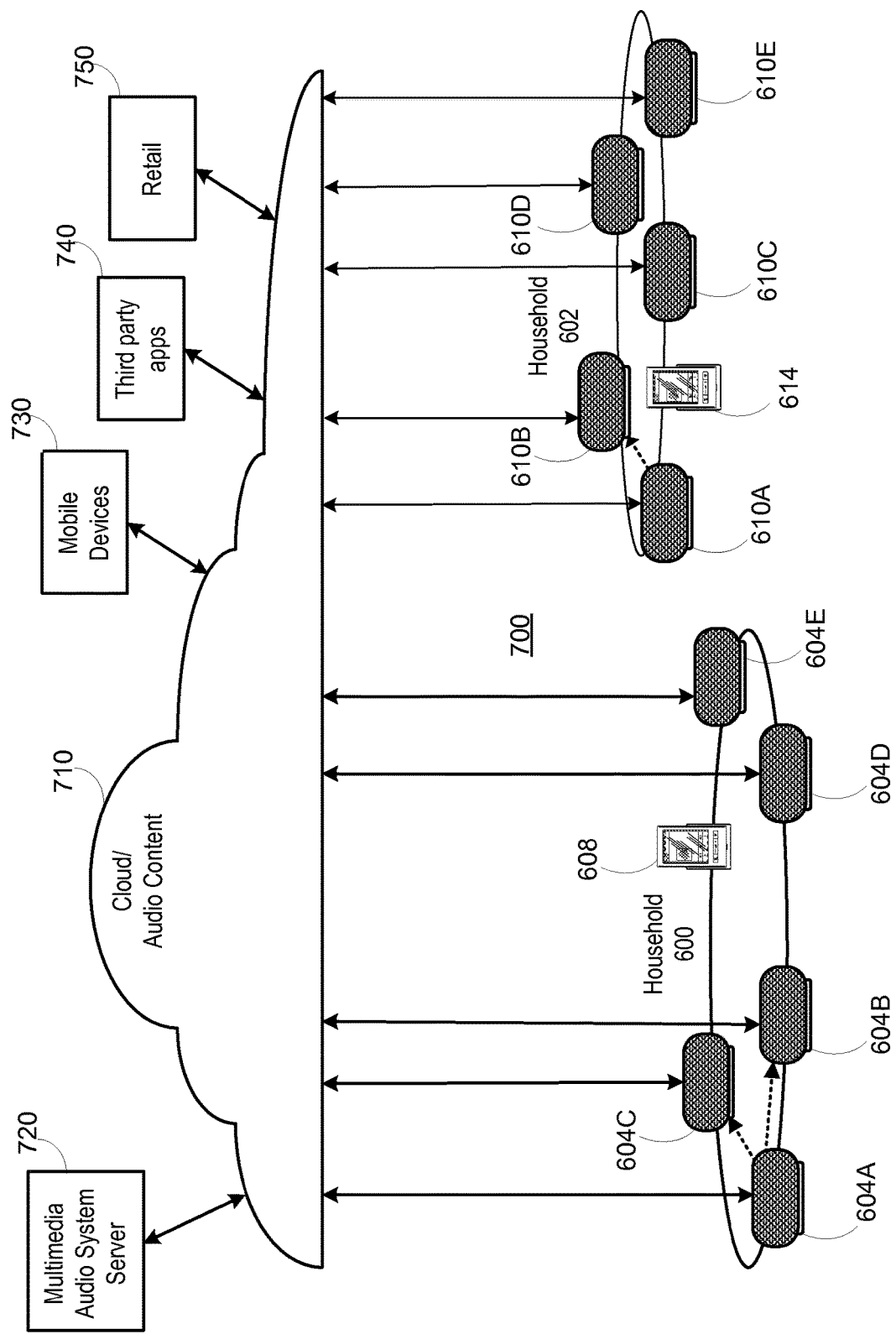
FIG. 7 shows a system including a cloud-based network and two local playback networks.

In another embodiment, households 600 and 602 may communicate via a remote server (e.g., a cloud server). To illustrate, consider FIG. 7 showing a system 700 that includes a remote server 710, which may be a part of a cloud-based network, and local playback networks (i.e., households 600 and 602). In some embodiments, a local playback network may include a plurality of playback devices or players, though it is understood that the playback network may contain only one playback device. In certain embodiments, each playback device may be configured to retrieve its content for playback. Control and content retrieval can be distributed or centralized, for example. Input can include streaming content provider input, third party application input, mobile device input, user input, and/or other playback network input into the cloud server for local distribution and playback.

A remote server 710 may be used for communication between households 600 and 602. For instance, the household may share information for mirroring a playback queue. Such information may include, for example: a name of an audio track, a source for obtaining an audio track, and one or more playback commands, among other possibilities. For example, household 600 may make information available on the server 710 which may then be retrieved from the server 710 by household 602, and vice versa.

Additionally or alternatively, the remote server 710 may be used for communications with content providers. For example, a multimedia audio system server 720, a mobile device 730, a third party application 740, a content provider 750 and so on may provide multimedia content (requested or otherwise) to households 600 and 602 via server 710. Note that zones featuring multiple playback devices (e.g., party room zone of household 600 and party room zone of household 602) are denoted by dotted arrows connecting playback devices as shown in FIG. 7. Additionally, note that separate servers may be used for different purposes (e.g., a first server for mirroring and a second server for obtaining content). Other examples may also be possible.

Figure 8A:
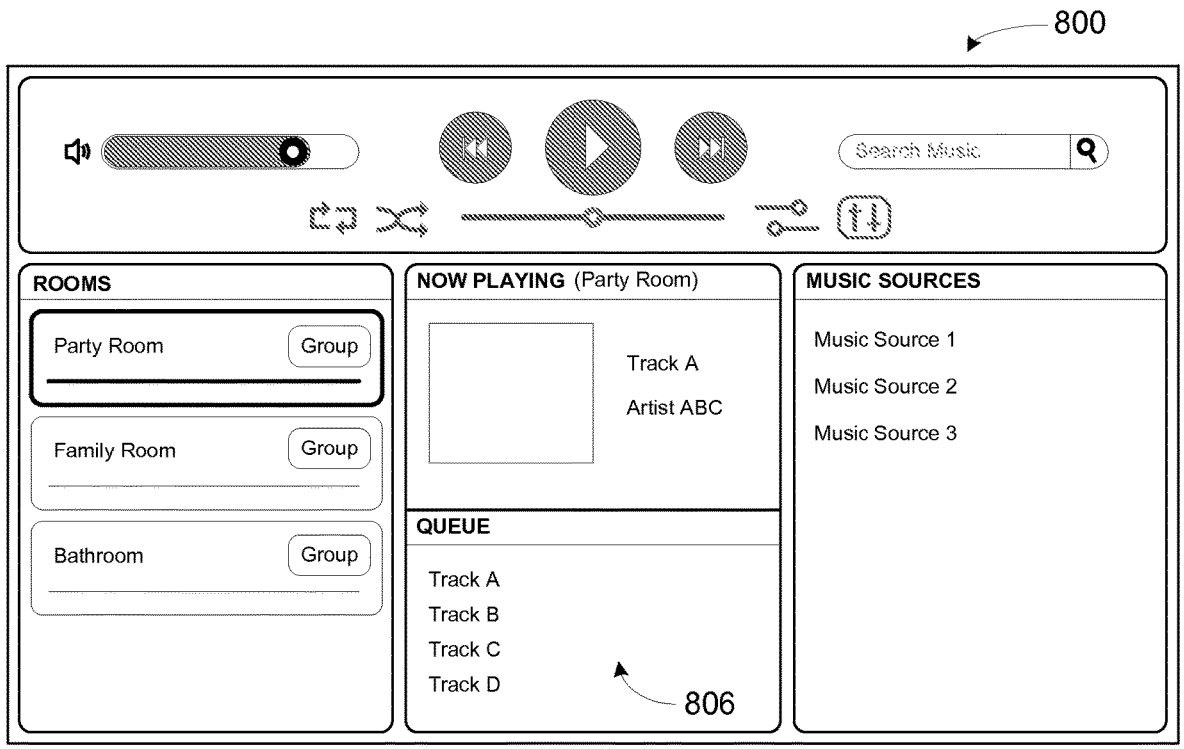
FIG. 8A shows two example user interfaces prior to mirroring.
Figure 8A:
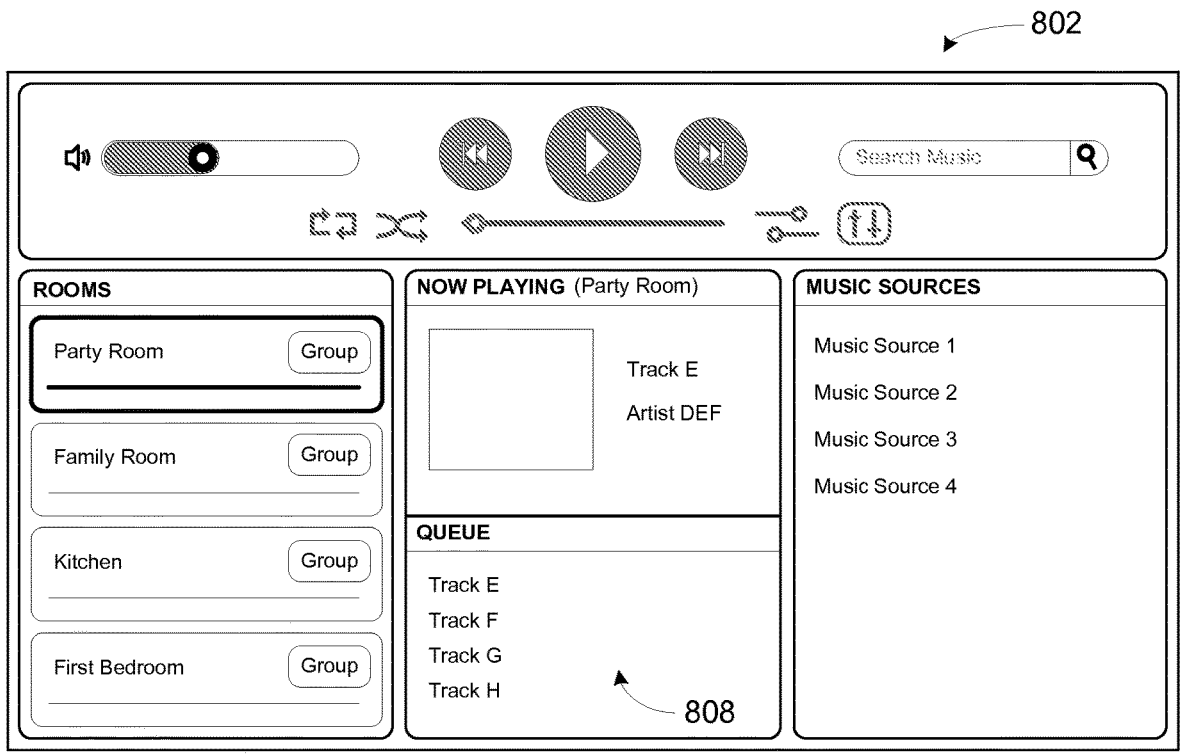

To further illustrate the concept of mirroring a playback queue, consider FIG. 8A showing example user interface 800 and example user interface 802. User interface 800 may be presented on controller 608 of household 600 or any other device in household 600. Additionally, user interface 802 may be presented on controller 614 of household 602 or any other device in household 602. Note that user interfaces 800 and 802 may be configured to include any of the features described above in association with controller interface 400 as shown in FIG. 4.

User interface 800 includes a playback queue region 806, which may include graphical representations of audio content in a playback queue associated with the selected playback zone (e.g., party room zone of household 600). Additionally, user interface 802 includes a playback queue region 808, which may include graphical representations of audio content in a playback queue associated with the selected playback zone (e.g., party room zone of household 602). Note that queue regions 806 and 808 may be configured to include any of the features described above in association with playback queue region 440 as shown in FIG. 4.

In particular, FIG. 8A is meant to illustrate the state of playback queue region 806 prior to mirroring the playback queue associated with device 610A of household 602. For example, queue region 806 shows that the playback queue of the party room zone in household 600 includes tracks A-D prior to mirroring. On the other hand, queue region 808 shows that the playback queue of the party room zone in household 602 includes tracks E-H.

Figure 8B:
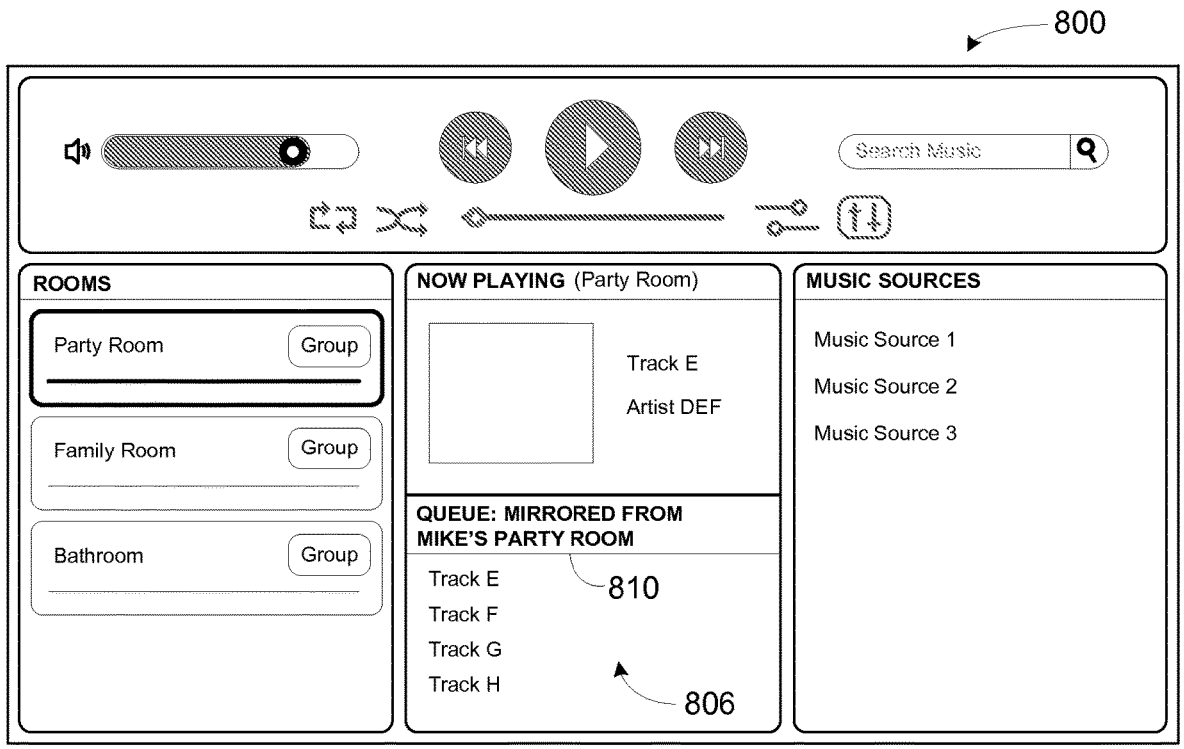
FIG. 8B shows two example user interfaces after mirroring.
Figure 8B:
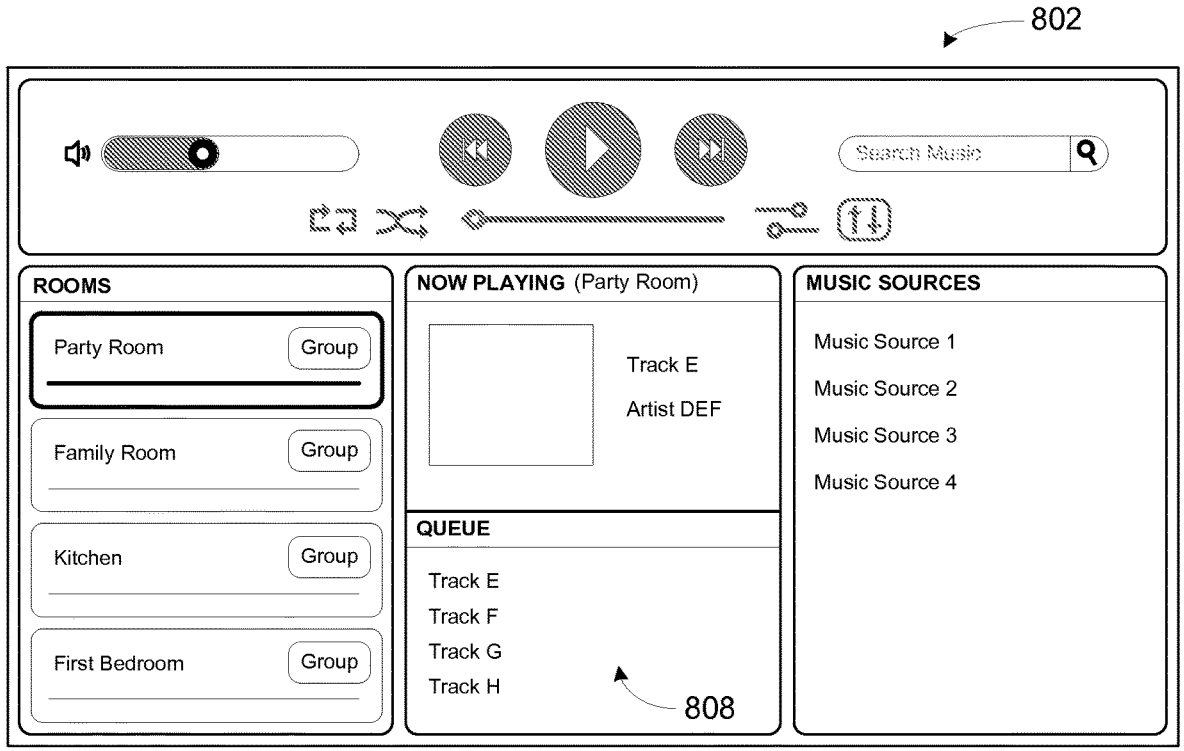

As noted above, once mirrored, the contents of a playback queue that is associated with the first playback device (i.e., device 604A) are the same (or similar in some respects) as contents of the playback queue that is associated with the second playback device (i.e., device 610A). To further illustrate this concept, consider FIG. 8B showing user interfaces 800 and 802, previously presented in FIG. 8B, after mirroring is carried out.

As shown, queue region 806 now provides graphical representations of the mirrored playback queue where the contents of the playback queue that is associated with device 604A are the same as contents of the playback queue that is associated with device 610A. In other words, queue region 808 shows that the playback queue of the party room zone in household 602 includes tracks E-H and, after mirroring, queue region 806 shows that the playback queue of the party room zone in household 600 also includes tracks E-H. Additionally, queue region 806 may also provide an indicator to a user that a particular playback queue has been mirrored. For example, in FIG. 8B, queue region 806 shows an indication 810 presented as "Queue: mirrored from Mike's party room". Other examples may also be possible.

Once the command for device 604A (i.e., first playback device) to mirror a playback queue associated with device 610A (i.e., second playback device) is carried out, the mirrored playback queue that is associated with device 604A may be further distributed to devices of the party room zone in household 600. After distribution, the mirrored playback queue may become available for synchronous playback among the devices of the party room zone in household 600.

In another case, the mirrored playback queue that is associated with device 604A may become available for playback among any combination of devices in household 600. In yet another case, the mirrored playback queue may become available for playback only on device 604A. Note that the availability of the mirrored playback queue among devices in household 600 may depend on predetermined user preferences. Further, in some cases, playback of the mirrored queue in one zone (such as party room zone of household 600) may occur simultaneously with playback of a different queue in another zone (such as the bathroom zone). The different queue in another zone may be a different mirrored queue (perhaps mirrored from a different device in household 602) or a non-mirrored queue. Other examples and combinations may also be possible.

Note that, before receiving the command discussed in accordance with block 504, a request to mirror the playback queue that is associated with the second playback device (i.e., playback device 610A) may be sent to the second household 602 via a direct communication link or via the cloud server 710. For example, the playback queue that is associated with device 610A may be made available on the cloud server 710 by a user of household 602. However, the availability of the playback queue for mirroring by another household may be restricted.

In one case, availability of one or more items of audio content in the playback queue for mirroring may be restricted due to the items having been obtained (e.g., streamed) by the device 610A from a third-party content provider. For example, the third-party content provider may restrict access to such audio content to paid subscribers and, thus, device 604A may not have access to such audio content without a subscription. In another case, mirroring of the playback queue by device 604A of household 600 may require access permission from household 602. Such access permission may be obtained after a request to mirror the playback queue that is associated with device 610A is sent by any device on household 600. Other cases may also be possible.

Once device 604A has been permitted to mirror the playback queue, the access permission can be maintained to allow mirroring of the playback queue in the future without having to request permission again. Alternatively, a request may have to be sent every time that device 604A seeks to mirror the playback queue (i.e., the access permission may be temporary). Additionally, certain households or devices may not require permission to mirror the queue while other households or devices may require permission (this may be due to predetermined user settings). Further, in another example, the playback queue that is associated with device 610A may not be made available on the cloud server 710. Therefore, a request to mirror a playback queue may also include a request to make a playback queue associated with device 610A available for mirroring (via a direct communication link or via the cloud server 710).

IV. Additional Features a. Controlling the Mirrored Playback Queue

In one case, based on the command described above, control of the mirrored playback queue that is associated with device 604A by devices associated with the first household 600 may be limited. For example, the playback queue associated with device 604A in household 600 may mirror the playback queue associated with device 610A in household 602. However, device 604A (as well as other devices in household 600) may be unable to control any aspect of the mirrored playback queue. In this case, control of the mirrored playback queue that is associated with device 604A may be carried out by one or more devices associated with household 602.

In another case, control of the mirrored playback queue that is associated with device 604A by devices associated with the first household 600 may be partially limited. For instance, devices of household 600 may be able to control certain aspects of the playback queue (e.g. pausing multimedia items) while being unable to control other aspects (e.g., addition of multimedia items to the queue). Note that control of the mirrored playback queue may depend on predetermined user preferences or settings of devices associated with household 600 and/or predetermined user preferences or settings of devices associated with household 602.

In yet another case, control of the mirrored playback queue that is associated with device 604A by devices associated with the first household 600 may be unlimited. For instance, devices of household 600 may control every aspect of the mirrored playback queue. In this case, control of the mirrored playback queue may be carried out by devices of both households 600 and 602 thus allowing for a collaborative playback queue. Alternatively, control of the mirrored playback queue may apply only to devices of household 600. Note that other examples and combinations of controlling the playback queue may also be possible.

Various processes may be used to control the mirrored playback queue that is associated with device 604A. For example, playback device 604A may receive a message from a device associated with the first household 600 (e.g., given permission to control the mirrored playback queue) or from a device associated with the second household 602. The message may be received via a direct communication link from the device or may be received via the cloud server 710. For instance, the message may include an instruction to modify the mirrored playback queue that is associated with the first playback device and/or an indication that the playback queue associated with second playback device 610A has been altered (and therefore the mirrored playback queue may be updated to maintain the mirroring). Within examples, updating and/or modifying the playback queue may involve one or more of the following: adding multimedia items to the playback queue, removing multimedia items from the playback queue, and renaming multimedia items in the playback queue, among other possibilities. Note that the tracks shown in queue regions 806 and 808 may also be referred to as multimedia items.

In another example, playback device 604A may receive a playback command to modify playback of a multimedia item identified in the mirrored playback queue that is associated with device 604A. The playback command may be received via a direct communication link from a device associated with the second household 602 or may be received via the cloud server 710. Based on the received playback command, playback of the identified multimedia item may be modified. For instance, a user of household 602 may act as a "remote DJ" for household 600 by modifying playback of multimedia items in the mirrored playback queue from a remote location.

Within examples, modifying playback of the identified multimedia item may include one or more of the following: playing the multimedia item, skipping the multimedia item to the next multimedia item, skipping the multimedia item to the previous multimedia item, stopping playback of the multimedia item, pausing playback of the multimedia item, fast forwarding or rewinding the multimedia item, changing playback volume of the multimedia item, changing the equalization of the multimedia item, enter/exit repeat mode, and enter/exit cross fade mode. Other examples may also be possible.

b. Mirroring the Playback Queue to Multiple Households

Figure 9:
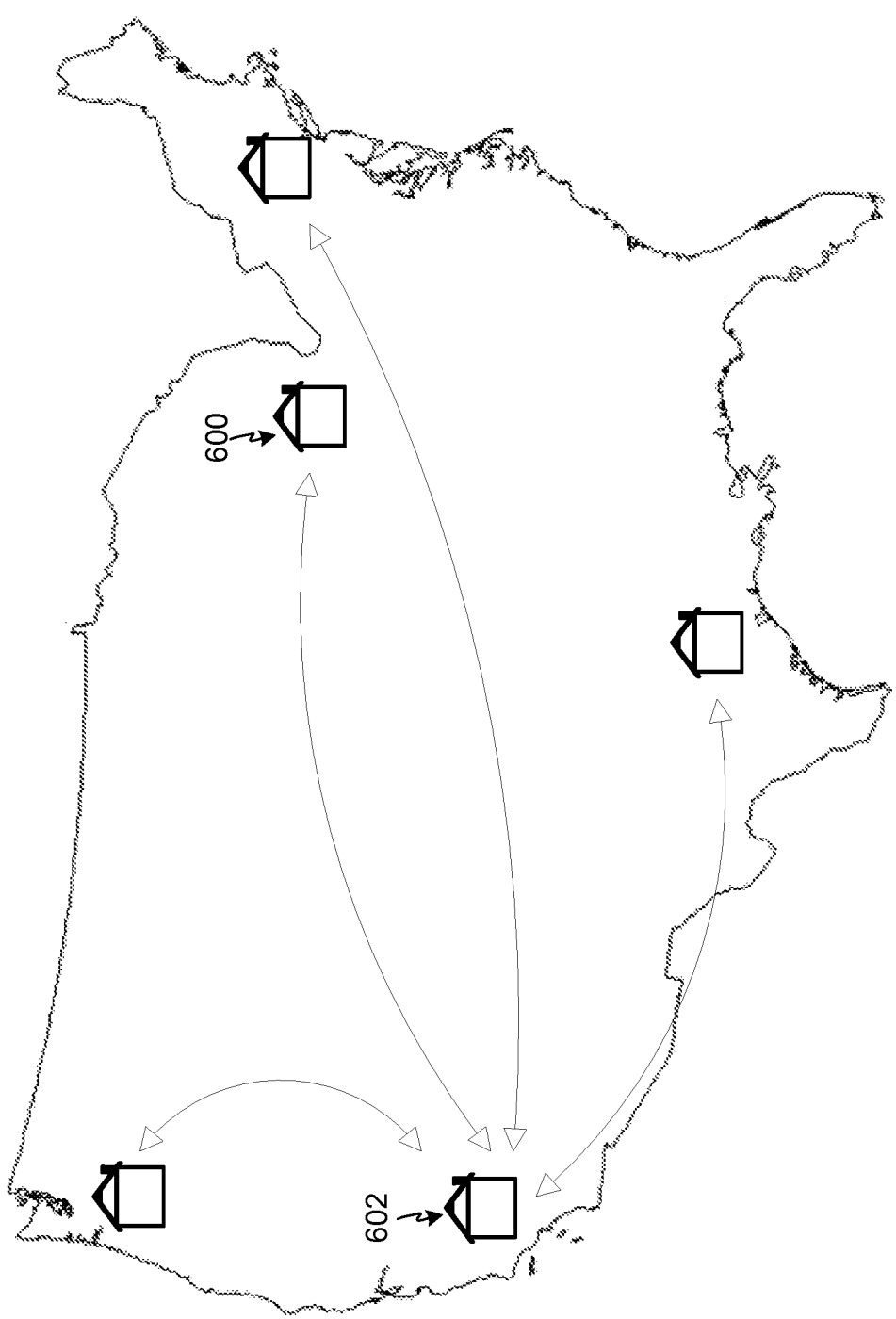
FIG. 9 shows example communication across multiple households.

In some cases, a user of a media playback system (e.g., household 602) may seek to make a playback queue available for mirroring to multiple households. To illustrate, consider FIG. 9 showing household 602 in communication with multiple households (including household 600), where the multiple households may be located anywhere. In one example, the multiple households may be in communication with household 602 via direct communication links. In another example, the multiple household may communicate with household 602 via the cloud server 710.

For instance, a playback queue associated with device 610A can be made available for mirroring on cloud server 710 by a user of household 602. The playback queue may then be mirrored by multiple household via the cloud server 710. The user of household 602 may then control the mirrored playback queue that is associated with the multiple households, via any device associated with household 602, of one or more households that selected to mirror the playback queue associated with device 610A. In other words, a user of household 602 may act as a "remote DJ" for multiple household located anywhere around the world.

c. Maintaining a List of Friends

In an example embodiment, it may be advantageous for a user of a media playback system (e.g., household 602) to maintain a list of friends (e.g., contacts), where each friend is associated with a playback queue that is available for mirroring. Such a list of friends may then be transmitted to and maintained on a controller device (e.g., controller 614) or any other device associated with the playback system. The list of friends may then be accessed via a user interface (e.g., of the controller) that is configured to facilitate user access and control of the list of friends. Each friend from the list of friends may have one or more queues available for mirroring (e.g., each zone within a friend's household may have a different queue). Additionally, a first user of a media playback system may mirror a second user's (of a different system) playback queue at any time as long as the second user is on the first user's list of friends.

In one example, friends may be added to the list of friends by searching a database of users, via the interface, where the database may be located on a remote server (e.g., server 720). In another example, the interface may be configured to allow a user to send recommendations to a friend from the list of friends, where the recommendations may include a suggested friend for addition or a suggested playback queue for mirroring. In yet another example, the interface may be configured to alert the user if a first friend from the list of friends has selected to mirror a playback queue associated with the household of a second friend from the list of friends. This may be advantageous as the user may see if two of his friends are currently mirroring each other's queues. Other examples may also be possible.

d. Reviews of a "Remote DJ"

In an example embodiment, a user of a media playback system may desire to review a friend (e.g., a "remote DJ") or a friend's playback queue. For instance, a first playback device (e.g. device 604A) may receive a command from a controller device (e.g., controller 608), where the command indicates that the first playback device is to transmit a review of a playback queue. Consequently, based on the received command, the review may be transmitted to a second playback device (e.g., device 610A) associated with a second household 602. The transmission may be via a direct communication link or may be carried out via the cloud server 710. A review of a playback queue can be made available on the cloud sever 710 such that other users may have access to the review. Additionally, a review may include: a rating based on numbers, a rating based on symbols (e.g., stars), and comments, among other possibilities.

In some cases, a user of a media playback system may sort (via the interface of a controller) playback queues, friends and/or other users based on reviews and other factors. For example, friends may be sorted based on the number of times their playback queues have been mirrored. In another example, playback queues may be sorted based on a rating. Other examples of sorting may also be possible.

e. Stopping Mirroring of the Playback Queue

In an example embodiment, a first playback device (e.g., device 604A) may receive a command indicating that the first playback device is to stop mirroring of the playback queue that is associated with the second playback device (e.g, device 610A). In response to the received command, the first playback device may stop mirroring of the playback queue that is associated with the second playback device. Subsequently, the first playback device may restore a prior playback queue that is associated with the first playback device. Content in the playback queue of the first playback device may have been stored prior to the first playback device mirroring the playback queue of the second playback device.

The command to stop mirroring may be received from any device associated with household 600 or any device associated with household 602. In particular, the command may be received via a direct communication link or may be received via the cloud server 710. Further, the restored playback queue may be the most recent playback queue associated the first playback device, a prior playback queue that is not the most recent playback queue, or a default playback queue, among other possibilities. For example, after mirroring has stopped, device 604A may restore the playback queue presented in queue region 806 of FIG. 8A. Other examples may also be possible.

V. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware.

Accordingly, the examples provided are not the only way(s) to implement such systems, methods, apparatus, and/or articles of manufacture.

As indicated above, the present application involves a first playback device, associated with a first household, which is configured to mirror a playback queue that is associated with a second playback device, where the second playback device is associated with a second household.

In one aspect, a device is provided. The device includes first playback device, where the first playback device includes a processor, a network interface, a non-transitory computer-readable storage medium, and program logic stored on the non-transitory computer-readable medium and executable by the processor to perform functions. The functions include receiving a command, the command indicating that the first playback device is to mirror a playback queue that is associated with a second playback device, where the first playback device is associated with a first household, and where the second playback device is associated with a second household. The functions include, based on the command, mirroring the playback queue that is associated with the second playback device such that contents of a playback queue that is associated with the first playback device are the same as contents of the playback queue that is associated with the second playback device.

In another aspect, a method is provided. The method involves receiving a command, at a first playback device that is associated with a first household, the command indicating that the first playback device is to mirror a playback queue that is associated with a second playback device, where the second playback device is associated with a second household. The method also involves, based on the command, mirroring the playback queue that is associated with the second playback device such that contents of a playback queue that is associated with the first playback device are the same as contents of the playback queue that is associated with the second playback device.

In yet another aspect, a non-transitory computer readable memory is provided. The non-transitory computer readable memory has stored thereon instructions executable by a processor to cause the processor to perform functions. The functions include associating the first playback device with a first household. The functions also include receiving a command, the command indicating that the first playback device is to mirror a playback queue that is associated with a second playback device, where the second playback device is associated with a second household. The functions further include, based on the command, mirroring the playback queue that is associated with the second playback device such that contents of a playback queue that is associated with the first playback device are the same as contents of the playback queue that is associated with the second playback device.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A controller device comprising:
   at least one processor;
   non-transitory computer-readable medium; and
   program instructions stored on the non-transitory computer-readable medium that are executable by the at least one processor such that the controller device is configured to:
   display, on a user interface, a graphical representation of a first playback queue of a first media playback system, wherein the first media playback system includes the controller device;
   receive an input indicating that the first media playback system is to mirror a second playback queue of a second media playback system, wherein the second media playback system does not include the controller device; and
   after receiving the input:
   cause the first media playback system to mirror the second playback queue of the second media playback system such that a media content in the first playback queue of the first media playback system is the same as a media content in the second playback queue of the second media playback system;
   update the graphical representation of the first playback queue to show that the media content in the first playback queue of the first media playback system is the same as the media content in the second playback queue of the second media playback system; and
   cause the first media playback system to play back the media content concurrently with the second media playback system.

2. The controller device of claim 1, wherein the program instructions that are executable by the at least one processor such that the controller device is configured to cause the first media playback system to mirror the second playback queue of the second media playback system comprise program instructions that are executable by the at least one processor such that the controller device is configured to cause the first media playback system to mirror the second playback queue of the second media playback system via a computing system remote to both the first media playback system and the second media playback system.

3. The controller device of claim 2, wherein the computing system comprises a source of the media content.

4. The controller device of claim 1, further comprising program instructions stored on the non-transitory computer-readable medium that are executable by the at least one processor such that the controller device is configured to:
cause any update to the second playback queue of the second media playback system to be reflected in the first playback queue of the first media playback system; and
wherein the program instructions that are executable by the at least one processor such that the controller device is configured to cause the first media playback system to play back the media content concurrently with the second media playback system comprise program instructions that are executable by the at least one processor such that the controller device is configured to cause the first media playback system to play back the first playback queue when the second media playback system is playing back the second playback queue.

5. The controller device of claim 1, wherein:
the first media playback system is in a local area network, and
the second media playback system is (i) outside of a communication range of the local area network and (ii) connected to the first media playback system via a wide area network.

6. The controller device of claim 1, further comprising program instructions stored on the non-transitory computer-readable medium that are executable by the at least one processor such that the controller device is configured to:
control at least one playback functionality related to playback of the media content;
wherein the controller device is not authorized to control at least one other playback functionality related to playback of the media content.

7. The controller device of claim 1, wherein:
the first media playback system further comprises at least one playback device.

8. The controller device of claim 7, wherein:
the program instructions that are executable by the at least one processor such that the controller device is configured to cause the first media playback system to play back the media content comprise program instructions that are executable by the at least one processor such that the controller device is configured to cause the at least one playback device to play back the media content.

9. The controller device of claim 7, further comprising program instructions stored on the non-transitory computer-readable medium that are executable by the at least one processor such that the controller device is configured to:
communicate with the at least one playback device via a first network; and
communicate with the second media playback system via a second, different network.

10. The controller device of claim 9, wherein:
the first network is a local area network and the second network is a wide area network.

11. The controller device of claim 7, wherein:
the at least one playback device comprises headphones.

12. A non-transitory computer-readable medium, wherein the non-transitory computer-readable medium is provisioned with program instructions that, when executed by at least one processor, cause a controller device to:
display, on a user interface, a graphical representation of a first playback queue of a first media playback system, wherein the first media playback system includes the controller device;
receive an input indicating that the first media playback system is to mirror a second playback queue of a second media playback system, wherein the second media playback system does not include the controller device; and
after receiving the input:
cause the first media playback system to mirror the second playback queue of the second media playback system such that a media content in the first playback queue of the first media playback system is the same as a media content in the second playback queue of the second media playback system;
update the graphical representation of the first playback queue to show that the media content in the first playback queue of the first media playback system is the same as the media content in the second playback queue of the second media playback system; and
cause the first media playback system to play back the media content concurrently with the second media playback system.

13. The non-transitory computer-readable medium of claim 12, wherein the program instructions that, when executed by at least one processor, cause the controller device to cause the first media playback system to mirror the second playback queue of the second media playback system comprise program instructions that, when executed by at least one processor, cause the controller device to cause the first media playback system to mirror the second playback queue of the second media playback system via a computing system remote to both the first media playback system and the second media playback system.

14. The non-transitory computer-readable medium of claim 13, wherein the computing system comprises a source of the media content.

15. The non-transitory computer-readable medium of claim 12, wherein the non-transitory computer-readable medium is also provisioned with program instructions that, when executed by at least one processor, cause the controller device to:
cause any update to the second playback queue of the second media playback system to be reflected in the first playback queue of the first media playback system; and
wherein the program instructions that, when executed by at least one processor, cause the controller device to cause the first media playback system to play back the media content concurrently with the second media playback system comprise program instructions that, when executed by at least one processor, cause the controller device to cause the first media playback system to play back the first playback queue when the second media playback system is playing back the second playback queue.

16. The non-transitory computer-readable medium of claim 12, wherein:
the first media playback system further comprises at least one playback device.

17. The non-transitory computer-readable medium of claim 16, wherein:
the program instructions that, when executed by at least one processor, cause the controller device to cause the first media playback system to play back the media content comprise program instructions that, when executed by at least one processor, cause the controller device to cause the at least one playback device to play back the media content.

18. The non-transitory computer-readable medium of claim 16, wherein the non-transitory computer-readable medium is also provisioned with program instructions that, when executed by at least one processor, cause the controller device to:

communicate with the at least one playback device via a first network; and communicate with the second media playback system via a second, different network.

19. The non-transitory computer-readable medium of claim 16, wherein:

the at least one playback device comprises headphones.

20. A method carried out by a controller device, the method comprising:

displaying, on a user interface, a graphical representation of a first playback queue of a first media playback system, wherein the first media playback system includes the controller device;

receiving an input indicating that the first media playback system is to mirror a second playback queue of a second media playback system, wherein the second media playback system does not include the controller device; and after receiving the input:

causing the first media playback system to mirror the second playback queue of the second media playback system such that a media content in the first playback queue of the first media playback system is the same as a media content in the second playback queue of the second media playback system;

updating the graphical representation of the first playback queue to show that the media content in the first playback queue of the first media playback system is the same as the media content in the second playback queue of the second media playback system, and causing the first media playback system to play back the media content concurrently with the second media playback system.

\* \* \* \* \*